Figure 1:
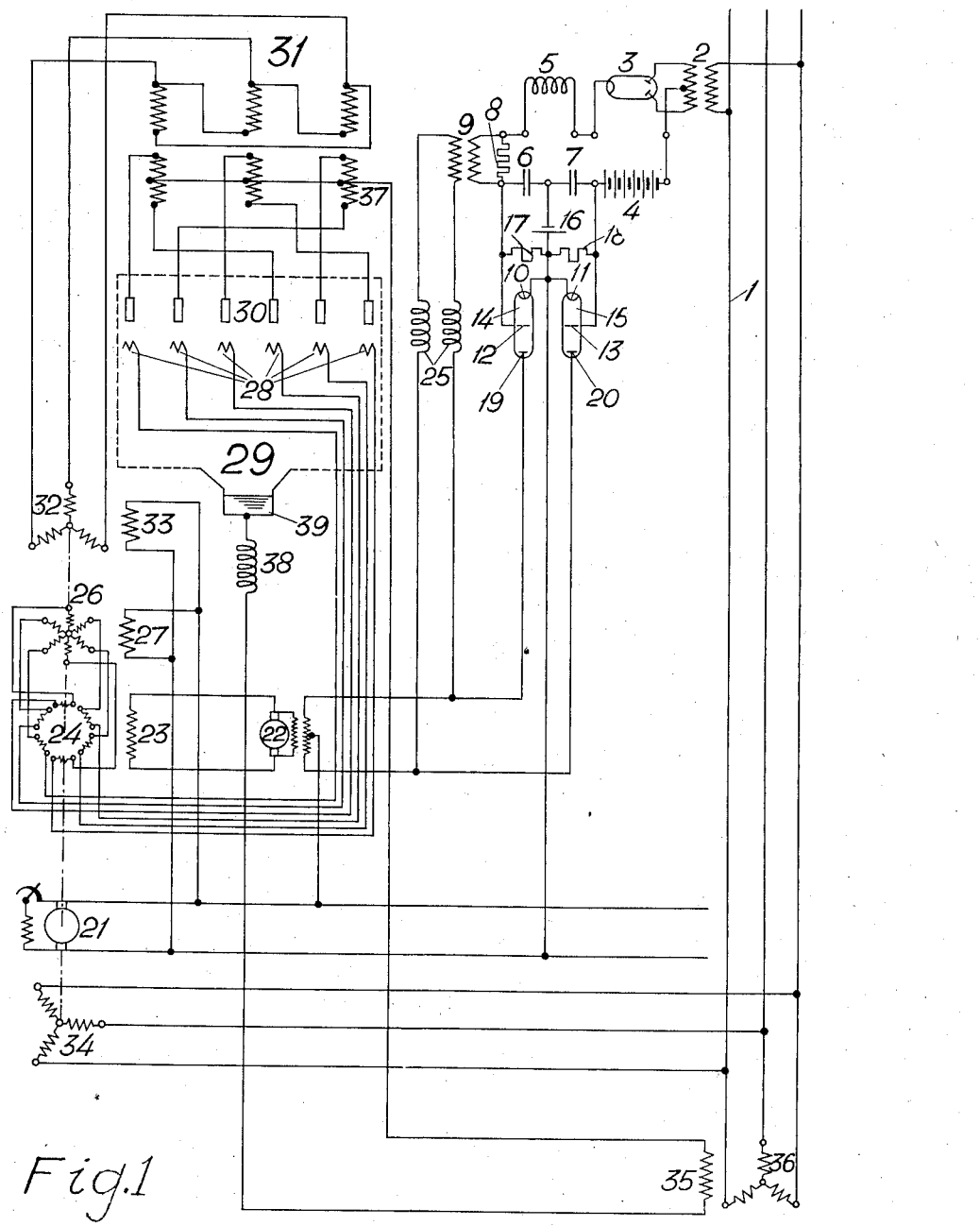

Inventor
Arle Torbjörn Ytterberg.
Attorney

Patented Oct. 24, 1939

2,177,424

UNITED STATES PATENT OFFICE 2,177,424

ELECTRICAL REGULATOR

Arle Torbjörn Ytterberg, Vasteras, Sweden, assignor to Allmänna Svenska Elektriska Aktiebolaget, Vasteras, Sweden, a corporation of Sweden Application March 22, 1935, Serial No. 12,452
In Sweden March 29, 1934

6 Claims. (Cl. 171—119)

In order that a regulator may be able to perform an exact setting of the quantity, which is to be regulated to its normal value, it is necessary that the regulator is normally in an oscillating state. This is usually so expressed that the regulator is said to be a ticking one. In such a regulator, a difference of the quantity to be regulated from its normal value causes a deviation of the mean value of the oscillating movement, and this deviation is utilized for connecting-in a factor for directly or indirectly restoring the regulated quantity back to its normal value. Due to the fact that the regulator is oscillating, even an infinitively small difference in the regulated quantity from its normal value will cause a corresponding deviation of the mean value of the oscillating movement with a corresponding restoring of the regulated quantity. This is not the case in other regulators which, in order to function, require a rather considerable departure from the normal value. If by a sufficient difference such a regulator is caused to function, an exact setting is still impossible because the function of the regulator will stop as soon as the regulated quantity is brought within the unavoidable limits of sensitivity of such a regulator.

All oscillating or ticking regulators have hitherto been built with a mechanically oscillating system, which has performed the connecting-in of the governing or executing factor for the restoring of the regulated quantity back to its normal value.

One object of the present invention is to provide a regulator in which the mechanically oscillating system is replaced by an oscillating electric circuit. In this circuit an oscillating current normally exists and a difference between the regulated quantity and the normal value, if the difference is small, causes only a deviation of the mean value of the oscillation, and first if the difference becomes large, the oscillation will stop and the oscillating current will be replaced by a direct current.

The oscillating circuit contains a member to represent the regulated quantity as a voltage and a member to represent a comparison quantity also as a voltage and contains further an inductance and a capacitance which two latter determine the natural oscillating frequency of the circuit. The circuit also contains means for the maintenance of the oscillation. In this circuit the voltage representing the regulated quantity and the comparison quantity counteract each other and the counteraction will be complete when the regulated quantity has been brought back to the normal value. When a change in the regulated quantity occurs, one of the representing voltages will predominate and act on the members performing or effecting the regulation.

The electric oscillations normally present in the circuit are maintained in spite of the damping of the circuit so that these oscillations cause a corresponding change in the voltage or current of another circuit magnetically or otherwise coupled to the oscillating circuit and these changes react on the oscillating circuit so that the oscillations are maintained with a frequency determined by the inductance and capacitance of the circuit.

A further object of this invention is to provide a device for the performance of a very rapid regulation which in spite of the rapidity is not liable to hunting. A rapid regulation is only partly dependent on the reaction speed of the regulator and depends chiefly on the magnitude of the regulation effecting factor, which is caused to act directly or indirectly on the regulated quantity in a restoring sense. A serviceable regulating device must be such that it is free from hunting and must therefore be such that the executing factor may be fully utilized without any risk of hunting. According to the invention, a regulation with the use of a very large executing factor but without risk of hunting is effected in such manner that the action of the executing factor is interrupted or reversed at a moment so long before the termination of the regulation that the regulated quantity aperiodically approaches the normal value. This is accomplished by means of a complementary factor which is added to the voltage representing the regulated quantity, which factor firstly rises from zero according to an exponential function to a value which added to the voltage representing the regulated quantity makes the sum equal to the voltage representing the normal value. In this moment the action of the executing factor is reversed and the complementary factor falls to zero according to an exponential function and reaches the value zero when the regulation is finished. By the above-mentioned use of a very large executing factor, which is reversed in a suitable moment which moment in its turn is determined by the complementary factor, a restoring of the regulated quantity is performed in the shortest possible time. In order that the rapidity of the regulation thus performed may be fully utilized, it is also necessary that the member for connecting-in the exectiting factor also acts with a very great speed. It is therefore advisable for this purpose to use an electron or discharge apparatus, for instance a grid control mercury rectifier, which may be fed either from the regulated network or from a separate current source. This apparatus in its turn is directly or indirectly controlled by the regulator.

Figure 2:
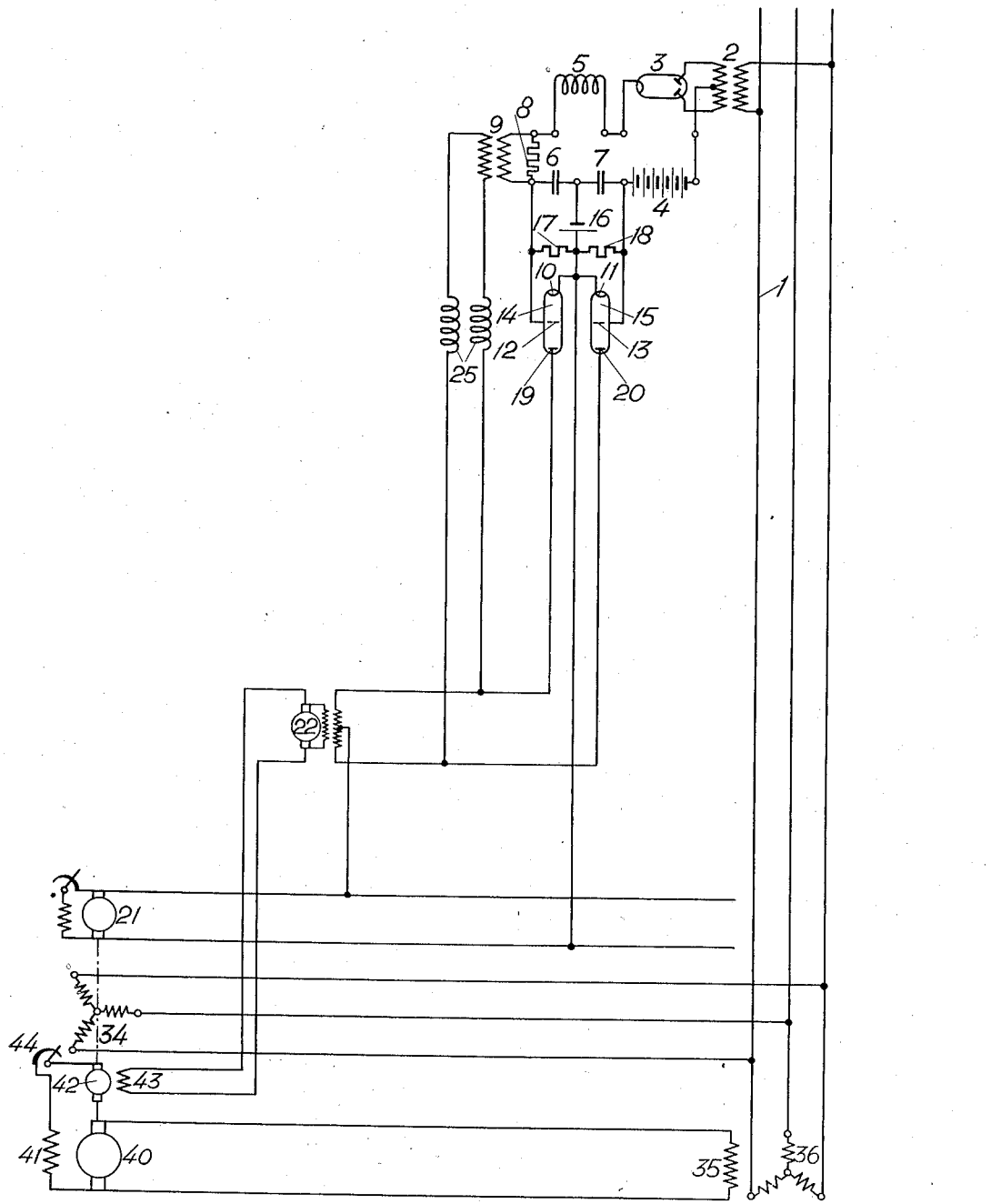

On the accompanying drawings, Fig. 1 shows one form of the invention, where the exciting current for the generator to be regulated is delivered from a grid controlled mercury rectifier, and Fig. 2 shows a form of the invention, where the exciting current for the generator is delivered from a rotating direct current exciting machine. In these figures corresponding parts are designated by the same reference numerals.

In Fig. 1, I designates the lines of a network, the voltage of which is to be regulated. 2 is a voltage transformer and 3 is a rectifier of a hot cathode type. 4 is an accumulator battery, 5 is an inductance coil and 6 and 7 condensers. 8 is a resistance inserted in the circuit and connected to the secondary winding of a transformer 9. The condensers 6 and 7 are inserted between the hot cathodes 10 and 11 and grids 12 and 13 in hot cathode valves 14 and 15 in series with a bias battery 16. Further two leakage resistances 17 and 18 are inserted between the cathodes and grids. The anodes 19 and 20 in said hot cathode valves 14, 15 are connected to a voltage source 21 in series with the separately fed excitation winding in the self-excitation exciter 22, which acts on the excitation winding 23 in a multiphase alternating generator 24. The cathodes of the said valves are connected to the other terminal of the voltage source 21. The primary winding of the transformer 9 is connected to the anodes 19 and 20 of the valves over an inductance coil 25. 26 is a multiphase alternating current generator with excitation winding 27 and this generator is so connected with the generator 24 that the voltages of the former generator are added to the voltages of the other with a 90° phase angle. These sum voltages are impressed on the grids 28 in a rectifier 29, the anodes 30 of which are fed from an alternating current generator 32 with a field winding 33 over a transformer 31. All the above-mentioned generators are suitably driven by a three-phase motor 34, which is connected to the network. The rectifier 29 may under certain conditions be fed from the regulated network, but this arrangement is accompanied by the disadvantage that the voltage of the rectifier will be dependent on the voltage of the network so that the necessary regulating voltage will cease or disappear when larger loading shocks or short-circuits occur. The rectifier 29 feeds the excitation winding 35 on the generator 36 in the following manner. One terminal of the excitation winding is connected to the secondary neutral point 37 of the transformer 31, whereas the other terminal is connected to the cathode 39 of the rectifier over the air inductance coil 38.

In certain cases the inductance coil 25 may be replaced by a so-called direct current transformer 9, i. e., a transformer with a very little amount of copper in the primary winding, the largest part of the winding space being occupied by the secondary winding. The transformer 9 is connected as shown by the dotted lines to the leads feeding the excitation winding 35, and in order to prevent the high harmonics from the rectifier to act on the regulator, a small inductance coil 40 is inserted in series with the transformer. A condenser 41 may also be inserted between the leads to the transformer.

The arrangement acts in the following way. When the voltage on the regulated network has its normal value, a voltage is induced in the transformer 2 which voltage rectified in the rectifier 3 is equal to the voltage of the battery 4. Due to the oscillation maintaining member 8 there is an oscillating current in the regulator circuit which causes a periodical change of the voltages on the condensers 6 and 7 and thus on the grids 12 and 13 so that the separately fed exciting winding on the exciter 22 will be traversed by an alternating current from the direct current source 21, and at the same time the voltage between the leads to the primary winding of the transformer 9 will also vary in the same manner. This latter voltage acts, however, on the primary winding of the transformer 9 over the inductance coil 25 so that the voltage on the primary terminals of the transformer will be in a phase displacement in relation to the first mentioned voltage and in such a manner that the voltage on the resistance 8 will be in phase with the oscillating current of the above-mentioned regulator circuit. Consequently this circuit will receive an active power which covers the losses of the circuit so that the oscillations are maintained with a constant amplitude and with a frequency equal to the natural frequeny of the circuit.

The current in the separately fed winding of the exciter 22 will then vary about zero, but due to the self-exciting winding the generator 22 will be able to give any voltage which is required for the generator to receive the excitation corresponding to its load condition. The voltage which is delivered from the exciter 22 will vary about the necessary mean value and will therefore receive a resulting voltage with a varying phase angle. The mean value of the phase position of this voltage will cause the anodes of the mercury rectifier 29 to ignite at such moments in relation to the alternating voltage from the generator 32 that the rectifier will give a determined mean direct voltage, which also varies with the same rhythm as the original variations. The rectifier will also give a variation with the frequency of the generator 32, but this frequency can always be made so high that it will not play any important roll in comparison with the above-mentioned relatively slow variations. This mean direct voltage will cause even that excitation current through the winding 35 which is necessary for the generator 36 to deliver the right voltage in the loading condition in question.

In order that the regulator at normal voltage shall oscillate about the zero value independently of the loading condition and independently of the required exciter voltage, it is necessary that the system contain a member, which changes the said exciter voltage with a velocity that is proportional to the deviation of the regulator oscillations from the oscillation zero value so that the exciter voltage may be independent of this deviation and be able to take any value when the regulator oscillates about the zero value. In the mechanically oscillating regulator, this member is the self-excited exciter itself, but in the present system this is accomplished by the self-excited auxiliary exciter 22.

If on the other hand a small change in the regulated quantity should occur, the manner of action will be the following. The voltage over the rectifier 3 is changed so that it will be different from that of the battery 4. This causes a voltage difference on the condensers 6 and 7, which in its turn causes a direct current to be superimposed on the alternating current, which traverses the separately fed winding of the exciter 22. This ensures that the voltage of this exciter is altered with a corresponding velocity and thus in turn ensures that the excitation voltage from the rectifier impressed upon the winding 35 will be altered with a corresponding velocity. At the same time, a constant voltage is superimposed over the varying voltage impressed on the inductance coil 25. This constant voltage component causes a current through the coil 25 and through the primary winding of the transformer 9, said current increasing according to an exponential function. This current is transformed to the secondary side of the transformer thus giving a voltage over the resistance 8 connected to the secondary winding and this voltage will also increase according to an exponential function. This voltage has such a direction that it in an increasing sense completes the voltage on the rectifier 3 with respect to the voltage on the battery 4. Before the regulating is terminated, the direct voltage components on the condensers 6 and 7 will change their signs so that the excitation voltage which, in order to enable a rapid regulation, has been raised over the necessary end value will have them to be restored to this end value at a moment where the regulation is terminated, thus completely preventing hunting.

At such minor disturbance of the regulated quantity the oscillating current will remain superimposed on the regulating progress. If on the other hand the disturbance is so large that the direct voltage difference, which occurs in the oscillating circuit, is larger than the amplitude of the oscillations, this will disappear but the relation will be performed in the manner just described.

When the load of the generator is considerably decreased, the excitation voltage generated by the rectifier will temporarily become negative whereby the excitation current will be decreased rapidly to the required low value, but the excitation current will not become negative. In this progress the rectifier, however, will give a negative voltage, but this is counteracted by the positive voltage generated by the field change in the excitation winding, and this will predominate over the voltage from the rectifier so that the anodes will still have a positive value with respect to the cathode as long as the excitation current exists. On the other hand the excitation current can never be negative as the rectifier is able to give a current only in a single direction.

As the rectifier, especially when the voltage is low, has a very peaked and unregular curve form, it is necessary that an effective inductance is inserted in the direct current circuit in order that the current on the direct current side shall not be zero when the voltage of the rectifier momentarily becomes negative. The excitation winding 35 is not sufficient for this purpose due to the eddy currents in the field cores. It is therefore necessary that an air inductance coil 38 is inserted in the direct current circuit, but it is not necessary that it be large, because the changes are very rapid in the voltage the influence of which on the current it has to prevent.

The inductance coil 25 may be omitted if the transformer 9 is dimensioned as a "direct current transformer", the latter expression only signifying a suitable dimensioning of the transformer 9. Such a transformer is described in the United States Patent No. 1,657,056 where it is designated by the reference number 53.

The arrangement according to Fig. 2 differs from that of Fig. 1 only in that the voltage of the exciter 22 acts upon the field 43 of an exciter 42. This exciter is inserted in the field circuit of the main exciter 40 in series with its field winding 41. The field circuit also contains a resistance 42 for setting the normal value of the voltage of the main exciter.

The exciters 40 and 42 as well as the direct current generator are driven by the synchronous motor 34.

I claim as my invention:

1. A control for an electric regulator in an electric power circuit, comprising a tuned circuit, coupling means between said power circuit and said tuned circuit whereby to introduce a voltage in said tuned circuit substantially proportional to that in said power circuit, means in said tuned circuit for normally supplying the same with a constant supply of direct current, said constantly supplied direct current normally cooperating with said introduced voltage whereby to maintain the oscillations of the current in said tuned circuit about a normal value, another electric circuit, said other circuit including current regulating means, said regulating means being connected to said tuned circuit whereby the current of said other circuit is effected by the oscillations in said tuned circuit, feed-back means from said other circuit to said tuned circuit, and variable means actuated by the current in the said other circuit for operating said regulator.

2. A control for an electric regulator in an electric power circuit, comprising a tuned circuit, coupling means between said power circuit and said tuned circuit whereby to introduce a voltage in said tuned circuit substantially proportional to that in said power circuit, direct current supply means in said tuned circuit for normally supplying the same with a constant supply of direct current voltage normally cooperating with the introduced voltage whereby to maintain the oscillations in said tuned current about a normal value, another electric circuit, said other circuit including current regulating means, said regulating means being connected to said tuned circuit whereby the current in said other circuit is effected by the oscillations in said tuned circuit, feed-back means from said other circuit to said tuned circuit, another source of voltage connected to said other circuit whereby to alter the current in said other circuit and said feed-back means in accordance with the relationship of the voltage from said other source to that in the oscillating circuit, and means actuated by the current in the said other circut for actuating said regulator.

3. A control for an electric regulator in an electric power circuit, comprising a power circuit, a regulator, a tuned circuit, coupling means between said power circuit and said tuned circuit and a rectifier in said tuned circuit whereby to introduce a direct current voltage in said tuned circuit substantially proportional to that in said power circuit, said tuned circuit including an inductance and capacitance, another source of direct current for constantly supplying a voltage representing a comparison value to the voltage introduced through said coupling means, and a resistance operatively connected to one another, a transformer having primary and secondary windings, the secondary winding of which is connected to said tuned circuit, and another circuit including the primary winding of said transformer, inductance means, and two grid control valves operatively connected, the grids of said valves being connected respectively to the opposite sides of said capacitance means whereby the current in said other circuit is effected by the current in said tuned circuit, and means actuated by the current in said other circuit for actuating said regulator.

4. A control for an electric regulator as claimed in claim 3, said means actuated by the current in said other circuit comprising a self-exciting exciter having a separately fed winding operatively connected to said other circuit, said exciter acting upon means for performing the regulation.

5. An electrical regulator for the control of an electrical quantity in an electric power circuit including means for producing the quantity to be regulated, comprising a power circuit, means for producing the quantity to be regulated, a tuned circuit comprising an inductance coil, a resistor, and capacitance means, said tuned circuit being coupled to said power circuit, coupling means between said tuned circuit and said power circuit, said tuned circuit also including a rectifier for passing a direct current substantially proportional to the quantity in said power circuit, and a source of direct current for supplying a voltage representing a comparison value to that introduced through said coupling means, a transformer having primary and secondary windings, the secondary winding thereof being connected to said tuned circuit, another circuit including the primary winding of said transformer, inductance means, and two grid-controlled valves, the grids being connected, respectively, to opposite sides of said capacitance, and an exciter circuit, including a self-exciting exciter provided with a separately fed winding operatively connected to said other circuit, a direct current generator excited by said exciter, an alternating current multi-phase generator, and a grid-controlled multi-grid rectifier, the grids of which are controlled by the sum of the voltages of said generators in added square-phase relationship, said rectifier serving as an exciter for said means for producing the quantity to be regulated.

6. An electrical regulator for the control of an electrical quantity in an electrical power circuit having a generator for the main source of power therein, comprising a power circuit, a generator, a control circuit coupled to said power circuit, said control circuit including a rectifier, a constant source of direct current voltage, inductance, resistance and capacitance means operatively connected to one another, a transformer having primary and secondary windings, the secondary winding of which is operatively connected to said control circuit, another circuit including the primary winding of said transformer, inductance means, and two grid-controlled rectifier means, the grids of said grid-controlled rectifier means being connected, respectively, to opposite sides of the capacitance means in said control circuit; and an exciter circuit, including a self-exciting exciter provided with a separately fed winding operatively connected to said other circuit, and a main exciter for exciting the field winding of said generator, said self-exciting exciter being operatively connected in the field circuit of said main exciter.

ARLE TORBJÖRN YTTERBERG.